(12) United States Patent
Tapper

(10) Patent No.: US 7,703,267 B2
(45) Date of Patent: Apr. 27, 2010

(54) MOWER BLADE COUPLER WITH ENLARGED HEAD AND PROJECTING FINS

(75) Inventor: Christopher S. Tapper, South Bend, IN (US)

(73) Assignee: Buchanan Metal Forming, Inc., Buchanan, MI (US)

( * ) Notice: Subject to any disclaimer, the term of this patent is extended or adjusted under 35 U.S.C. 154(b) by 0 days.

(21) Appl. No.: 12/196,822

(22) Filed: Aug. 22, 2008

(65) Prior Publication Data

US 2010/0043376 A1    Feb. 25, 2010

(51) Int. Cl.
*A01D 34/52* (2006.01)
*A01D 34/73* (2006.01)

(52) U.S. Cl. .......................................... 56/255; 56/295

(58) Field of Classification Search ................... 56/255, 56/295, 17.5, DIG. 17, 320.1
See application file for complete search history.

(56) References Cited

U.S. PATENT DOCUMENTS

| | | | |
|---|---|---|---|
| 2,677,916 A | | 5/1954 | Hannapel |
| 3,019,501 A | * | 2/1962 | Kraus et al. ................... 24/625 |
| 3,662,529 A | * | 5/1972 | Glunk et al. ................... 56/295 |
| 3,690,051 A | * | 9/1972 | Wood ........................... 56/295 |
| 3,918,241 A | * | 11/1975 | Stillions ....................... 56/12.7 |
| 4,313,297 A | * | 2/1982 | Maier ............................ 56/295 |
| 4,345,420 A | * | 8/1982 | Oosterling et al. ............. 56/295 |
| 4,525,990 A | * | 7/1985 | Zweegers ..................... 56/295 |
| 5,271,212 A | * | 12/1993 | Anderson .................... 56/12.7 |
| 5,406,418 A | | 4/1995 | Deary |
| 5,622,035 A | * | 4/1997 | Kondo et al. .................. 56/12.7 |
| 5,640,836 A | * | 6/1997 | Lingerfelt ..................... 56/255 |
| 5,809,765 A | * | 9/1998 | Hastings et al. ............... 56/295 |
| 6,026,635 A | * | 2/2000 | Staiger ......................... 56/295 |
| 6,055,798 A | * | 5/2000 | Fulmer et al. ................. 56/12.7 |
| 6,834,486 B2 | * | 12/2004 | Thompson et al. ............. 56/255 |
| 6,904,835 B2 | | 6/2005 | Dugan et al. |
| 6,959,530 B2 | * | 11/2005 | Thompson et al. ............. 56/295 |
| 7,490,459 B2 | * | 2/2009 | Thompson et al. ............. 56/255 |
| 7,506,494 B2 | * | 3/2009 | Eavenson et al. ............. 56/17.5 |
| 2002/0066263 A1 | * | 6/2002 | Megli ........................... 56/295 |
| 2004/0177484 A1 | * | 9/2004 | Thompson et al. ........ 29/402.03 |

* cited by examiner

*Primary Examiner*—Árpád Fábián-Kovács
(74) *Attorney, Agent, or Firm*—Van Dyker, Gardner, Linn & Burkhart, LLP

(57) ABSTRACT

A coupler comprising a shaft, an enlarged head, a proximal end of the shaft, and a journal for contacting and rotating in an annular bearing surface of a component for forming a pin connection with the component. In addition, the coupler includes a plurality of projecting fins projecting from the journal along axes generally parallel to the longitudinal axis of the shaft and are radially spaced around the journal.

9 Claims, 7 Drawing Sheets

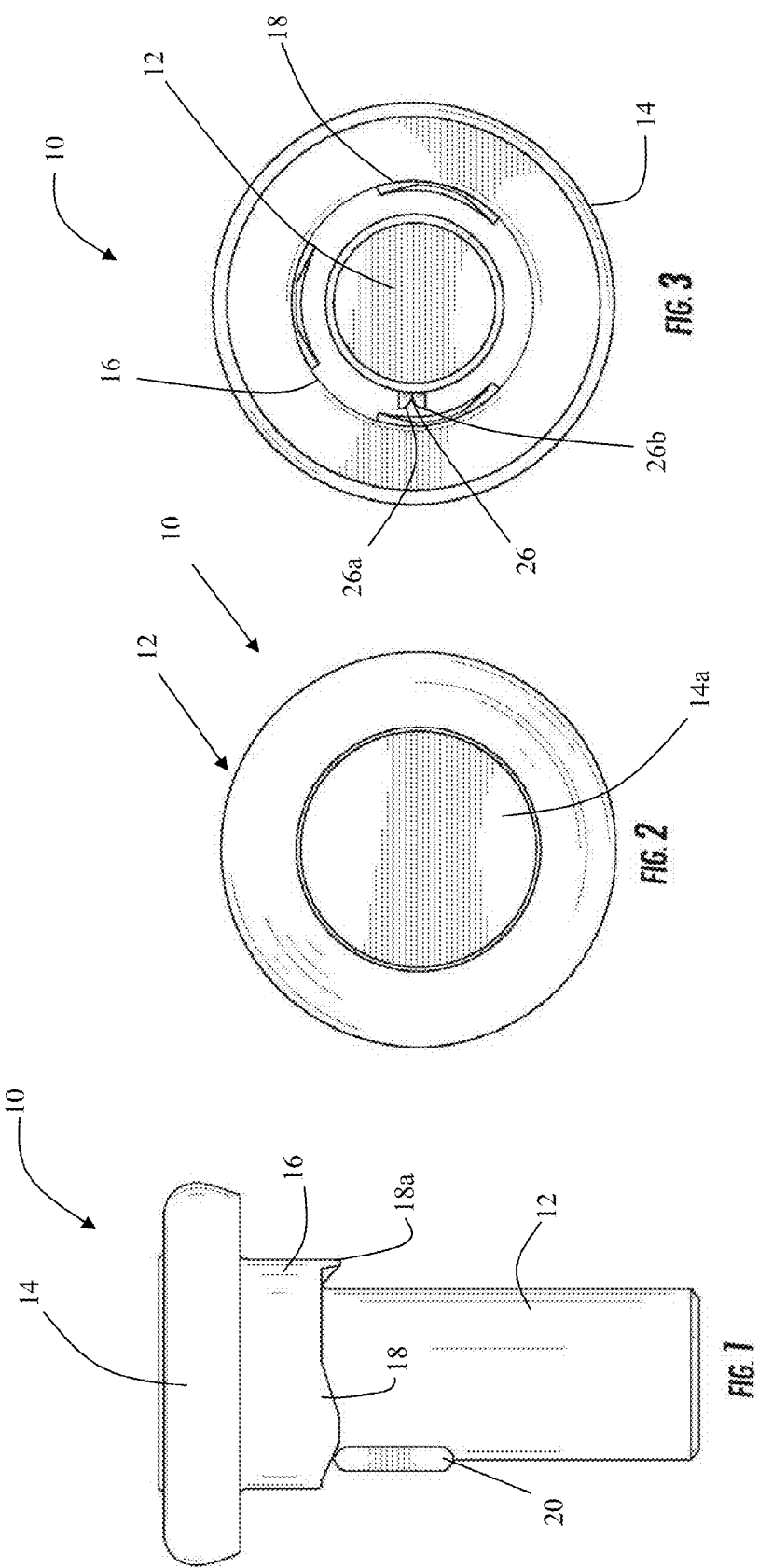

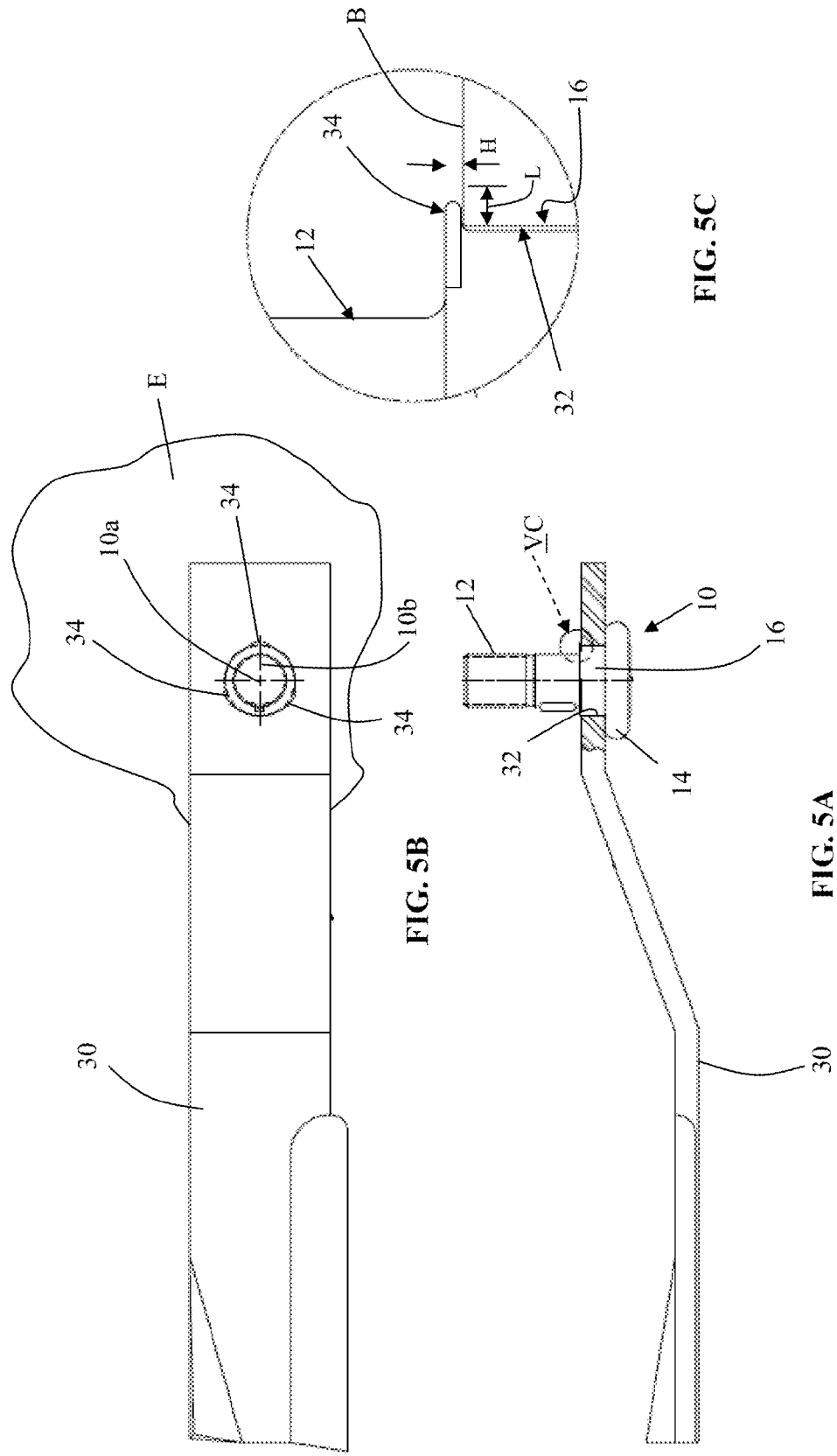

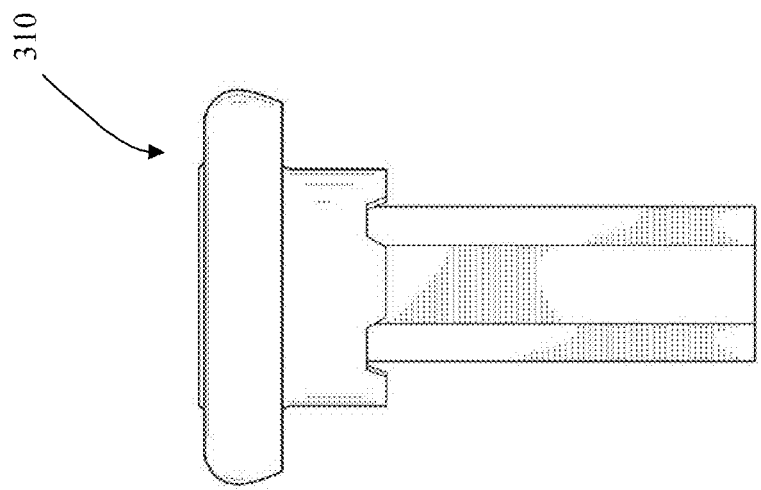
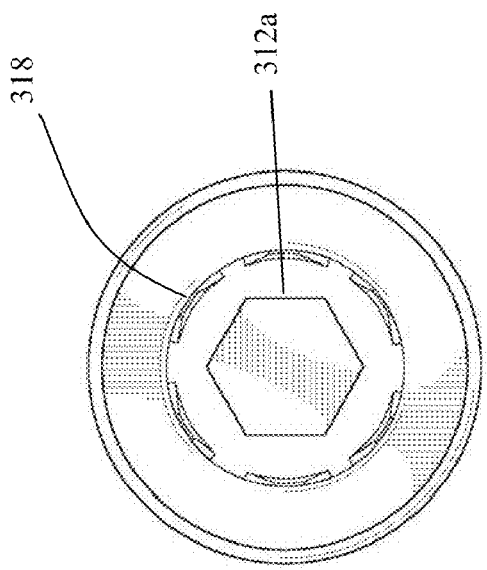
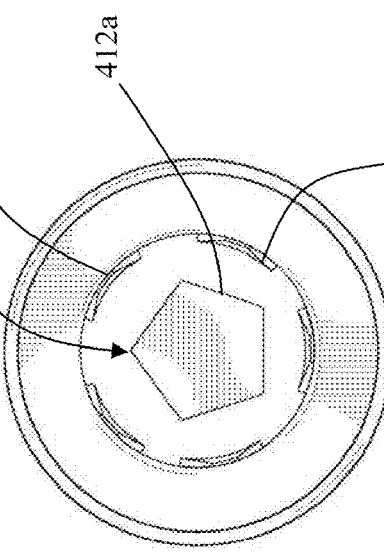
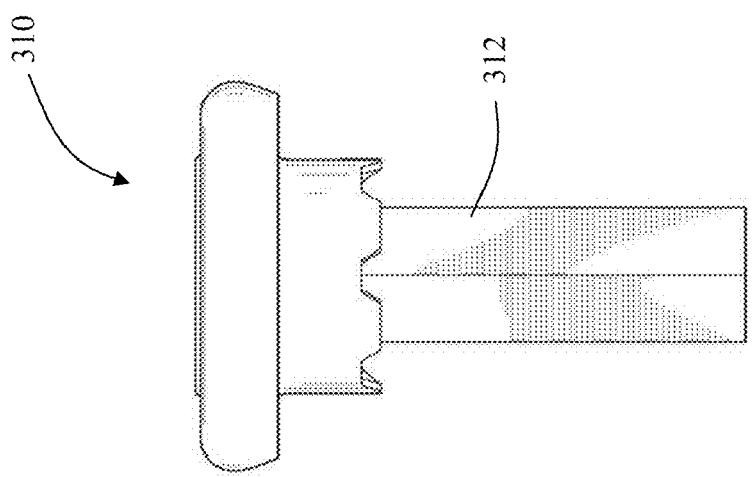

MOWER BLADE COUPLER WITH ENLARGED HEAD AND PROJECTING FINS

TECHNICAL FIELD AND BACKGROUND OF THE INVENTION

The present invention relates to a coupler and, more particularly, to a coupler that provides a pin connection and which can be used to mount a blade to grass mowing equipment, for example.

In grass mowing equipment, and especially large grass mowing equipment, for example the mowing equipment often used along highways, the loss of a mower blade while the equipment is being operated is dangerous. Therefore, it is important for the blade to be mounted to the rotating hub of the mower by a bolt that has the proper capacity.

Accordingly, there is a need to assure that the proper bolt or coupler is being used, especially in situations when failure of the connection using the bolt or coupler could expose someone to risk of injury.

SUMMARY OF THE INVENTION

Accordingly, the present invention provides an improved coupler that reduces the risk of the wrong coupler being used in a connection that can be subject to large loads and hence high stresses.

In one form of the invention, a coupler includes a shaft and an enlarged head formed on the end of the shaft. The head includes a journal for contacting and rotating in an annular bearing surface of a component to thereby form a pin connection with the component and further a plurality of projecting fins that project from the journal along axes generally parallel to the longitudinal axis of the shaft and which are radially spaced around the journal.

In one aspect, the shaft comprises a round cylindrical shaft. In other aspects, the shaft may have a multi-sided cylindrical shaft, such as a square, hexagonal or pentagonal sided cylindrical shaft.

In other aspects, the coupler includes two, three, four, five or six fins. In a further aspect, the shaft includes a key for cooperating with a keyway in the component.

According to yet other aspects, the journal has an annular outer surface, with each of the fins having an outer surface that is contiguous with the annular outer surface of the journal and lies in the same curved space as the curved surface of the annular outer surface of the journal.

According to a further aspect, when the coupler is mounted to the component, the fins are folded to thereby form outwardly projecting shoulders, which project outwardly from the curved surface of the annular outer surface of the journal.

In another form of the invention, a blade assembly includes a blade with a mounting opening and a coupler mounted in the opening. The coupler includes a shaft and an enlarged head formed on the end of the shaft. The head includes a journal, which has a greater transverse dimension than the shaft. The shaft is extended through the mounting opening with the journal located in the mounting opening and bearing on the annular bearing surface of the blade provided by the mounting opening. The journal is capture in the mounting opening by the enlarged head, which is positioned on one side of the blade, and by a plurality of outwardly extending shoulders formed at the terminal end of the journal which project radially outward from the annular surface of the journal and which are located on the other side of the blade.

In one aspect, the shoulders comprise folded members projecting from the journal.

In other aspects, the journal may include two, three, four, five or six shoulders.

In other aspects, the shaft includes a threaded portion for receiving a nut and for connecting the blade to mower equipment.

In another form of the invention, a method of mounting a coupler, which has a shaft and an enlarged head and a plurality of longitudinally extending fins that extend from the head along axes generally parallel to the longitudinal axis of the shaft, to a component, which has a mounting opening with a bearing surface, includes extending the shaft through the mounting opening wherein the fins project through the mounting opening. The fins are then folded to form a plurality of shoulders wherein the head is positioned on one side of the component and the shoulders are positioned on the other side of the component to thereby mount the coupler to the component.

A method of forming a coupler includes a forming a shaft, forming an enlarged head one end of the shaft, and forming a plurality of fins on the head that extend along axes generally parallel to the longitudinal axis of the shaft, wherein the fins are formed by cold forming a portion of the head.

These and other objects, advantages, purposes, and features of the invention will become more apparent from the study of the following description taken in conjunction with the drawings.

DESCRIPTION OF THE DRAWINGS

FIG. 1 is a side elevation view of a coupler design of the present invention;

FIG. 2 is a top plan view of the coupler of FIG. 1;

FIG. 3 is a bottom plan view of the coupler of FIG. 1;

FIG. 5A is a side partial fragmentary view of the coupler of the present invention mounted in a blade;

FIG. 5B is a top plan view of the blade and coupler of FIG. 5A shown mounted to a piece of equipment;

FIG. 5C is an enlarged detail view of area VC of FIG. 5A;

FIG. 12 is a front elevation view of another embodiment of a coupler design of the present invention;

FIG. 13 is a bottom plan view of the coupler of FIG. 12;

FIG. 14 is a left side elevation view of the coupler of FIG. 13;

FIG. 16 is a bottom plan view of the coupler of FIG. 15;

DESCRIPTION OF THE PREFERRED EMBODIMENT

Figure 6:
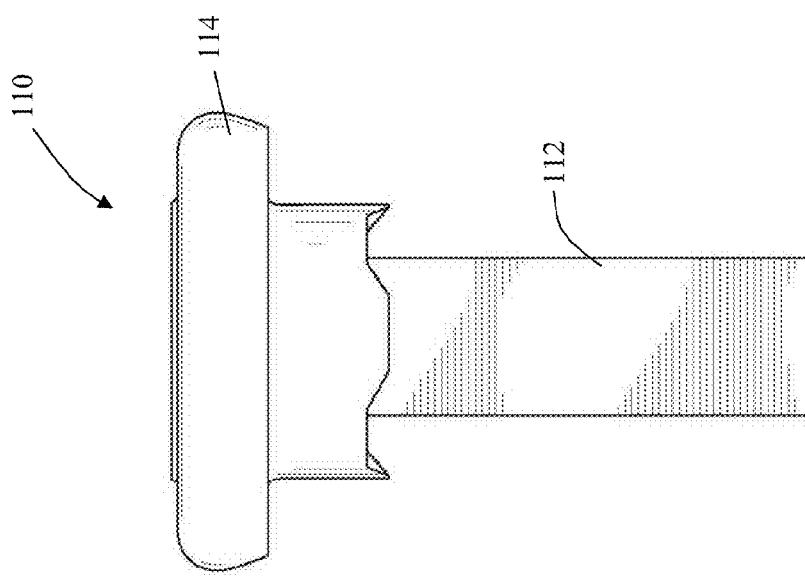
FIG. 6 is a front elevation view of another embodiment of the coupler design of the present invention.

Referring to FIG. 1, the numeral 10 generally designates a coupler of the present invention. As will be more fully described below, coupler 10 is adapted to be mounted to a component, such as a blade of a mower, for mounting the component to, for example, a piece of equipment E (FIG. 5B) in a manner to limit the removal of the coupler. Suitable mowing equipment includes residential mowing equipment or commercial mowing equipment, including for example, any of the Toro or John Deere mowing equipment. Coupler 10 has particular application high load applications where it is important to assure that the correct coupler has been used to mount the component to the equipment.

Referring to FIGS. 1-5, coupler 10 comprises a bolt and includes a shaft 12 and an enlarged head 14. Head 14 is formed on one end of the shaft and includes a downwardly extending annular collar 16, which forms a shoulder. As will be more fully described below in reference to FIGS. 5A-5C, shoulder 16 provides a journal for coupler 10 when mounted to a component.

Figure 5:
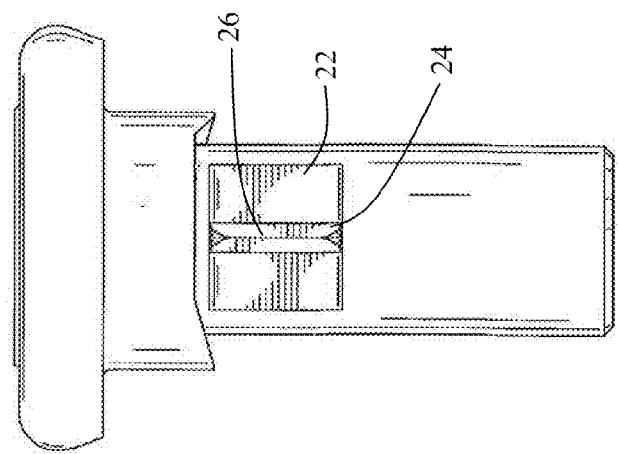
FIG. 5 is a front elevation view of the coupler of FIG. 1.
Figure 4:
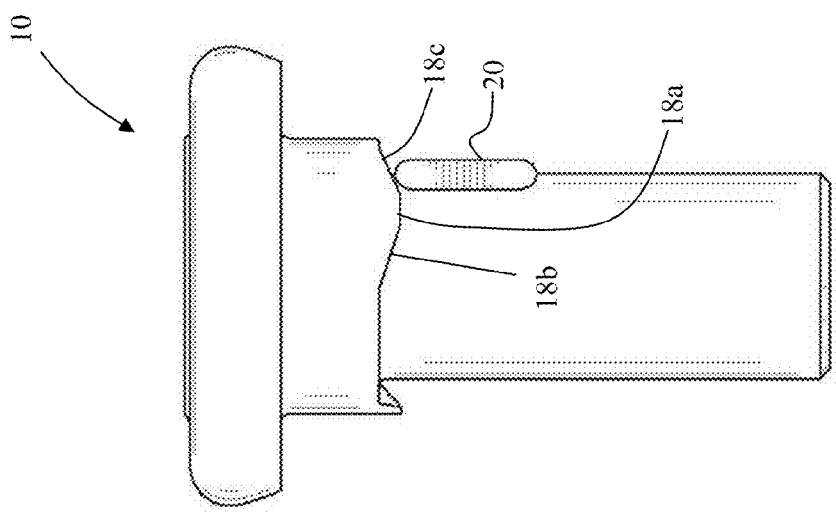
FIG. 4 is another side elevation view of the coupler of FIG. 1.

As best seen in FIGS. 1, 4, and 5, projecting downwardly from shoulder 16 (as viewed in FIGS. 1, 4, and 5) are a plurality of fins 18. As will be more fully described in reference to the method of making coupler 10, fins 18 may be formed from a portion of the material that forms shoulder 16. In the illustrated embodiment, coupler 10 includes three fins, which are generally equally, spaced around the shaft. Each fin has tapered sides starting at the juncture with the shoulder 16 and which terminate at a distal end 18a. In the illustrated embodiment, distal ends 18a are generally flat and form edges between the respective angled sides 18b and 18c; however, it should be appreciated that the shape and number of the fins may be varied.

Further, in the illustrated embodiment, shaft 12 comprises a round cylindrical shaft, but it should be understood from the alternate embodiments described below, the shaft's shape may be varied.

Referring to FIGS. 1 and 3-5, shaft 12 may include a key 20, which may be formed form the material forming shaft 12. When forming key 20, a localized planar surface 22 is created on shaft 20 on either side of the key. Key 20 may comprise a number of different shapes, but in the illustrated embodiment comprises an elongate body 24 (FIG. 5) with a generally central recess 26 that extends longitudinally along the longitudinal axis of elongate body 24. As best seen from FIG. 3, recess 26 is generally centrally located in body 24 and, further, is formed between arcuate surfaces 26a and 26b, which are formed when the material from shaft 12 is removed and compressed to thereby form the key.

Referring to FIGS. 5A-5C, coupler 10 is particularly suitable for use in mounting a blade 30 to a grass mower, for example. As best seen in FIG. 5A, blade 30 includes a mounting opening 32 in which coupler 10 is inserted and, further, placed such that annular member 16 is located in opening 32 to provide a journal or bearing contact with the blade. Once shaft 12 is inserted through the mounting opening, and shoulder 16 is positioned in mounting opening 32, fins 18 project outwardly from the blade on the other side of the mounting opening from enlarged head 14. The fins are then folded to form a shoulder 34 as best seen in FIG. 5C. Referring to FIG. 5B, when fins 18 are folded, shoulders 34 are arranged radially around the longitudinal axis of bolt 10 and provide a three point contact between the coupler and blade 30 in the direction of the longitudinal axis of coupler 10.

In this manner, when coupler 10 is mounted to blade 30, coupler 10 cannot be removed without removal of the shoulders.

For example, for a coupler with nominal diameter of 1 inch, shoulders 34 may be configured to have a minimum lateral dimension as measured along lateral axes 10a of coupler 10 of about 0.06 inches and may fall in the range of about 0.06 to 2.0 inches, depending on the size of the coupler. It should be understood that these dimensions are given as examples only and the dimensions may vary depending application and material used.

Figure 8:
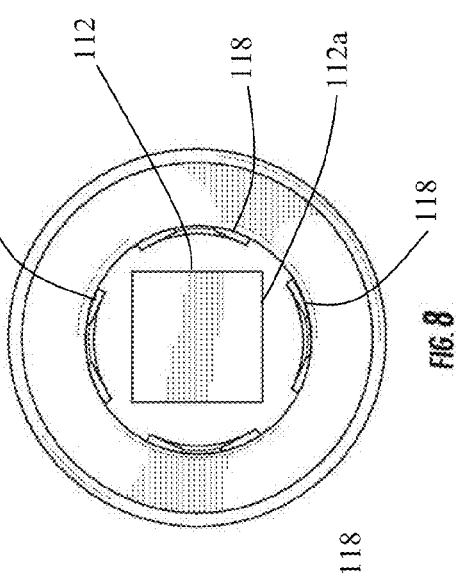
FIG. 8 is a bottom plan view of the coupler of FIG. 6.
Figure 18:
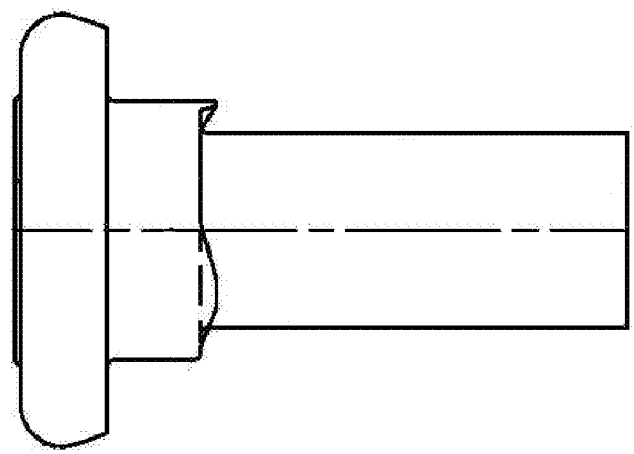
FIGS. 17-21 illustrate the steps of forming the coupler of the present invention.
Figure 17:
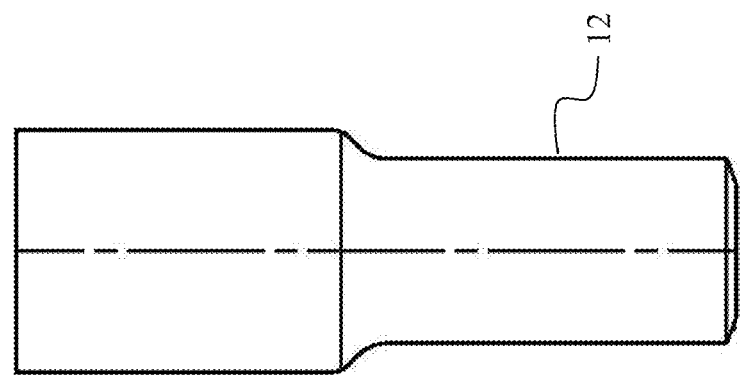

Referring to FIG. 6, the numeral 110 generally designates another embodiment of the coupler of the present invention. Coupler 110 is similar to coupler 10 and includes a shaft 112 and an enlarged head 114. In the illustrated embodiment and as best seen in FIG. 8, shaft 112 comprises a square shaft with each of the respective fins 118 generally aligned with a respective side 112a of the shaft. In the illustrated embodiment, therefore, coupler 10 includes four fins, one associated with each side of the shaft. The remaining details of coupler 110 are similar to the details of coupler 10. Therefore, for further details of coupler 110, reference is made to coupler 10.

Figure 10:
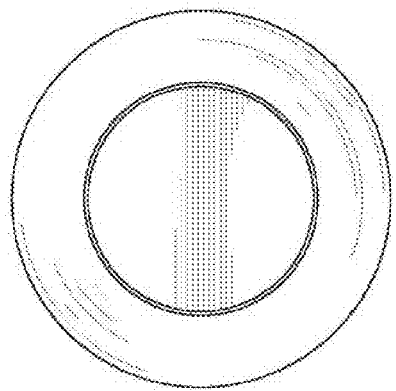
FIG. 10 is a top plan view of the coupler of FIG. 9.
Figure 11:
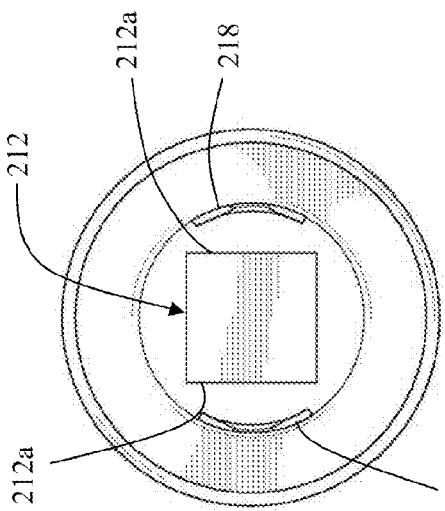
FIG. 11 is a bottom plan view of the coupler of FIG. 9.
Figure 9:
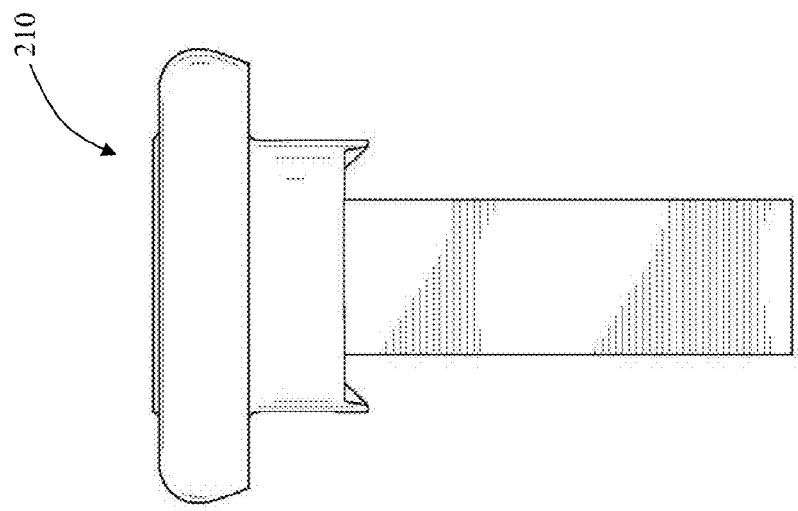
FIG. 9 is a front elevation view of another design of the coupler of the present invention, which is substantially identical to the rear elevation view of the coupler.
Figure 7:
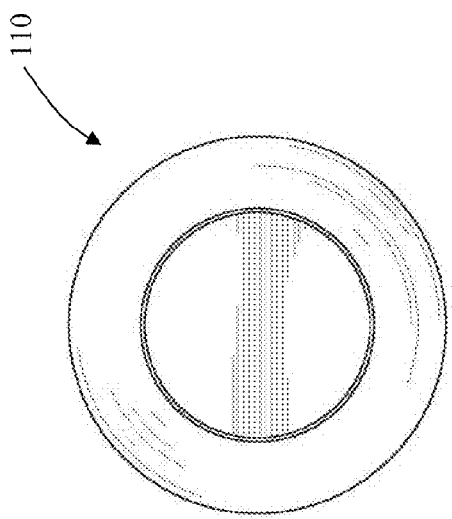
FIG. 7 is a top plan view of FIG. 6.

It should be understood that the number of fins may be varied. For example, referring to FIGS. 9-11, coupler 210, which is similar to coupler 110, includes a pair of fins 218, which are generally aligned with opposed sides 212a of shaft 212, which is a square shaft similar to shaft 112. As noted above, the shape of the shaft may be varied.

Referring to coupler 310, FIGS. 12 and 13 includes a hexagonal-sided shaft 312, with a fin 318 associated with each side 312a of shaft 312. As noted above, the number of fins may be modified though it is preferred to have a balanced arrangement. For example, two or three fins may be used provided they are spaced generally evenly around the center axis of the coupler.

Figure 15:
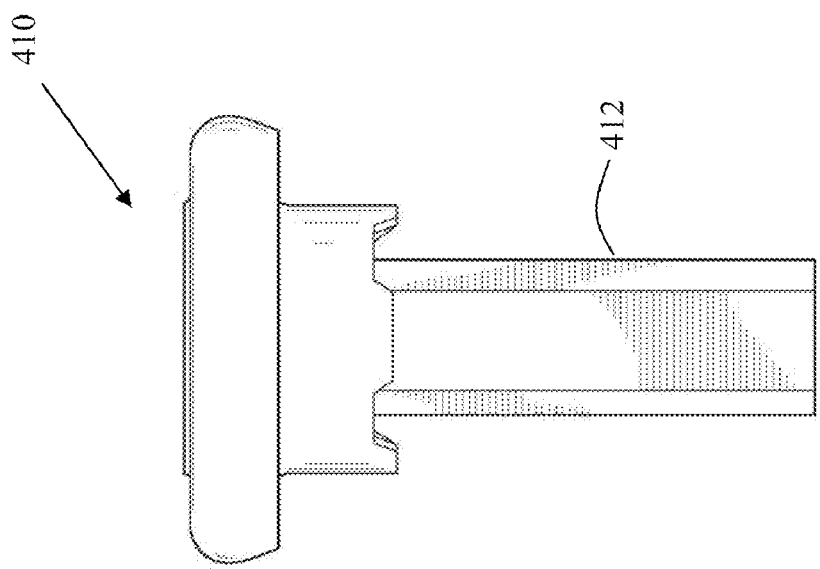
FIG. 15 is a front elevation view of another embodiment of a coupler of the present invention.
Figure 22:
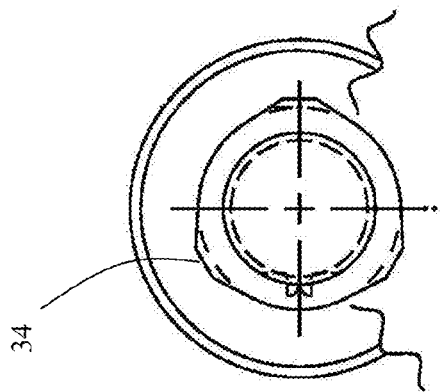
FIG. 22 is a partial fragmentary bottom plan view of the coupler of FIG. 21 in its final form.
Figure 21:
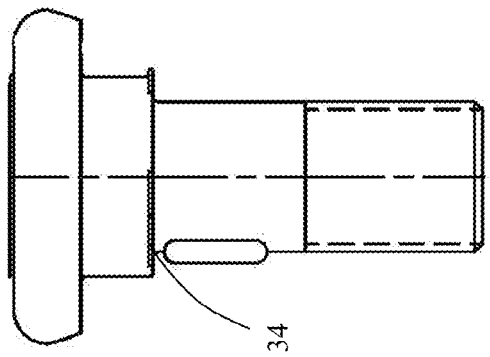
Figure 20:
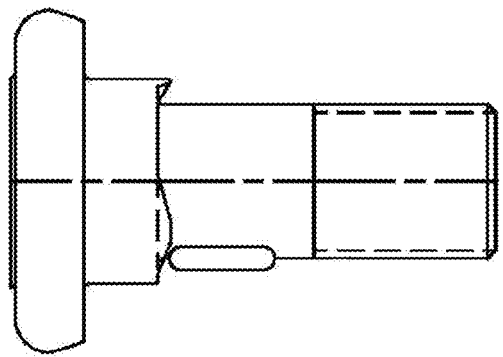
Figure 19:
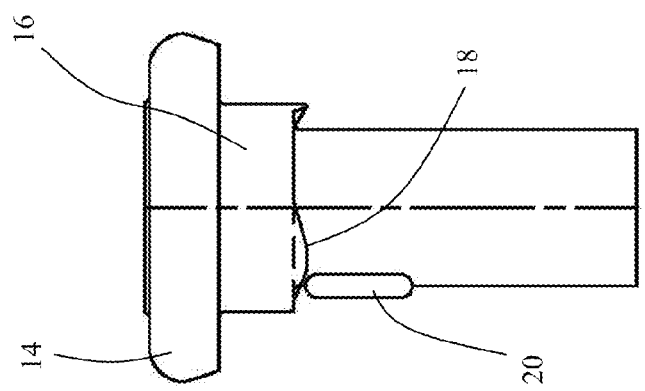

Referring to FIG. 15, coupler 410 includes a shaft 412 with a pentagon-shaped shaft 412. As best seen in FIG. 16, in order to provide a balanced support system, coupler 410 includes five fins 418, with each fin associated with a side 412a of coupler 412 in a similar manner described in reference to the previous embodiments.

Referring to FIGS. 17-22, coupler 10 is formed from bar stock, for example of carbon steel. The shaft portion of coupler 10 is formed by extrusion of the bar stock into the desired cross-section. For example, in the illustrated steps, the lower portion is extruded into a circular shaft. The upper portion of the bar stock is then formed, such as by cold forging (upsetted), into the enlarged head 14 and shoulder 16. A portion of the shoulder is then cold forged into fins 18, which provides a uniform grain flow and which does not significantly, if at all, impact the structural strength of the shoulder region. Similarly, key 20 is cold forged from a portion of the shaft mass. Again, the mass that is removed from the shaft to form the key does not significantly, if at all, impact the structural strength of the shaft.

The lower end of the lower portion of the shaft is then threaded for receiving a nut for securing the coupler to the desired surface.

For example, for a 1 inch nominal diameter coupler, the height of enlarged head 14 may be approximately ½ inch with an outer diameter of approximately 2.47 inches to 2.530 inches. The height of the shoulder 16 may fall in the range of 0.53 to 0.545 inches with an outer diameter (OD) of 1.488 to 1.498. The overall length of the shoulder at the center of each fin may fall in a range of 0.1 inch to 0.085 inches. The key, for example, may have a height in a range of 0.72 inches to 0.82 inches with its center located below the terminal edge of the collar in a range of about 0.38 inches to 0.5 inches.

As described above, when coupler 10 is mounted to the component, for example blade 30, fins 18 are compressed and folded to form shoulders 34 with a minimum width as measured from the outer circumference of shoulder 16 of about 0.06 inches. For example, the height of the shoulder may be approximately 0.03 inches. It should be understood that the foregoing dimensions are provided merely as exemplary dimensions only and are not intended to limit the scope of the invention.

Accordingly, the present invention provides a coupler that may be mounted and secured to a component, which may be particularly useful when used in high load applications when the coupler specifications must be controlled to assure the safe operation of the component.

While several forms of the invention have been shown and described, other forms will now be apparent to those skilled in the art. Therefore, it will be understood that the embodiments shown in the drawings and described above are merely for illustrative purposes, and are not intended to limit the scope of the invention which is defined by the claims which follow as interpreted under the principles of patent law including the doctrine of equivalents.

The embodiments of the invention in which I claim an exclusive property right or privilege are defined as follows:

1. A blade assembly comprising:
    a blade having a mounting opening and first and second annular bearing surfaces extending around said mounting opening on first and second sides of said blade, respectively; and
    a coupler mounted in said opening, said coupler including a shaft, an enlarged head at one end of said shaft, and a journal with a greater transverse dimension than said shaft but smaller transverse dimension than said head, said shaft extending through said mounting opening with said journal located in said mounting opening, and said journal being captured in said mounting opening by said enlarged head, which bears on said first annular surface at said first side of said blade and by a plurality of outwardly extending projections formed at the terminal end of said journal, which project radially outward from said journal and bear on said second annular bearing surface on said second side of said blade to thereby capture the journal in said mounting opening and, further, not permit removal of said coupler from said blade without removal of said projections.

2. The blade assembly according to claim 1, wherein said projections comprise folded members projecting from said journal.

3. The blade assembly according to claim 1, wherein said shaft includes a threaded portion for receiving a nut thereon and for connecting the blade to a mower equipment.

4. The blade assembly according to claim 1, further in combination with a mowing equipment, said blade assembly mounted to said mowing equipment.

5. The blade assembly according to claim 1, wherein said plurality of outwardly extending projections are formed by fins.

6. The blade assembly according to claim 5, wherein said fins project from said journal along axes generally parallel to the longitudinal axis of said shaft and are at radially spaced locations around said journal.

7. The blade assembly according to claim 1, wherein said shaft comprises a round cylindrical shaft or a multi-sided cylindrical shaft.

8. The blade assembly according to claim 1, wherein said shaft further includes a key for cooperating with a keyway in the blade.

9. The blade assembly according to claim 6, wherein said fins are folded to thereby form said outwardly extending projections.

* * * * *